United States Patent
Cravo et al.

(10) Patent No.: US 11,943,415 B2
(45) Date of Patent: Mar. 26, 2024

(54) REPURPOSING A DOCUMENT

(71) Applicant: HEWLETT-PACKARD DEVELOPMENT COMPANY, L.P., Spring, TX (US)

(72) Inventors: Diogo Raphael Cravo, Porto Alegre (BR); Ricardo Beck, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 396 days.

(21) Appl. No.: 16/603,409

(22) PCT Filed: Aug. 18, 2017

(86) PCT No.: PCT/US2017/047628
§ 371 (c)(1),
(2) Date: Oct. 7, 2019

(87) PCT Pub. No.: WO2019/035846
PCT Pub. Date: Feb. 21, 2019

(65) Prior Publication Data
US 2021/0127033 A1 Apr. 29, 2021

(51) Int. Cl.
*G06F 40/114* (2020.01)
*G06V 30/414* (2022.01)
(Continued)

(52) U.S. Cl.
CPC ......... *H04N 1/3876* (2013.01); *G06F 40/114* (2020.01); *G06V 30/414* (2022.01); *G06V 30/416* (2022.01)

(58) Field of Classification Search
CPC .... H04N 1/3876; H04N 1/387; G06F 40/114; G06F 40/10; G06K 9/00463; G06K 9/00469
See application file for complete search history.

(56) References Cited

U.S. PATENT DOCUMENTS 5,680,198 A   10/1997  Ohnishi
7,210,102 B1   4/2007  Gordon et al.
(Continued)

FOREIGN PATENT DOCUMENTS

CN    106326193 A    1/2017

OTHER PUBLICATIONS

NAGY 6 et al: "A prototype document image analysis system for technical journals", Computer, IEEE Computer Society, vol. 25, No. 7, Jul. 1, 1992, pp. 18-22.
(Continued)

*Primary Examiner* — Sanchita Roy
(74) *Attorney, Agent, or Firm* — Michael Dryja (57) ABSTRACT

When repurposing a document, a processor reads a document having multiple pages and extracts three samples of the multiple pages of the document. For each of the three samples, the processor compares sequential pages within a respective sample to identify a pattern of markers, such as page numbers. A marker is found by splitting a page into smaller regions and wherein each smaller region is searched for the marker and if the marker is not found continuing to split a smaller region into further smaller regions. The processor removes the markers based on identified patterns for each respective sample of the document.

15 Claims, 9 Drawing Sheets

(51) Int. Cl.
*G06V 30/416* (2022.01)
*H04N 1/387* (2006.01)

(56) References Cited

U.S. PATENT DOCUMENTS

| | | |
|---|---|---|
| 7,797,622 B2 | 9/2010 | Dejean et al. |
| 8,849,033 B2 | 9/2014 | Yoshida |
| 9,008,425 B2 | 4/2015 | Dejean et al. |
| 2002/0186424 A1 | 12/2002 | Sturgeon et al. |
| 2002/0198878 A1 | 12/2002 | Baxter et al. |
| 2004/0119998 A1 | 6/2004 | Xiong |
| 2004/0139384 A1* | 7/2004 | Lin ................... G06F 40/151 |
| | | 715/261 |
| 2008/0114757 A1* | 5/2008 | Dejean ............... G06F 16/258 |
| 2009/0073501 A1 | 3/2009 | Gutarin |
| 2011/0225490 A1 | 9/2011 | Meunier |
| 2013/0191366 A1 | 7/2013 | Jovanovic et al. |
| 2014/0298167 A1 | 10/2014 | Jones et al. |
| 2016/0314104 A1 | 10/2016 | Phillips et al. |

OTHER PUBLICATIONS

BCS-2® Classic: Scan Software for Digitisation of all Kinds of Bound & Printed Materials, 2017, <http://www.imageware.de/en/solutions/scansoftware/bcs-2-classic/ >.

Optical Character Recognition, Jan. 4, 2013, <https://www.digitisation.eu/download/website-files/BPG/OpticalCharacterRecognition-IBPG_01.pdf >.

\* cited by examiner

REPURPOSING A DOCUMENT

BACKGROUND

With the advent of personal computing, tablets, smartphones, e-readers, display, and printing technology there are multiple ways to consume media content. Traditional methods of creating content include book publishing, professional journals, research papers, conference proceedings and the like. Often, readers of such content wish to combine several types of content sources.

BRIEF DESCRIPTION OF THE DRAWINGS

The disclosure is better understood with reference to the following drawings. The elements of the drawings may not be to scale relative to each other. Rather, the emphasis has instead been placed upon clearly illustrating the claimed subject matter. Furthermore, like reference numerals designate corresponding similar parts, though not inevitably identical parts, throughout the several views.

DETAILED DESCRIPTION

Content from different sources may be uploaded to a single electronic device or printed. However, the various possible different formats of the different content may lead to a less than desirable user experience. What is desired is that any electronic and printed content chosen by a user be combined into a single unified document that allows a reader to consume the content as a "book-of-one." A "book-of-one" in this context means that the unified document may have a consistent formatting and consecutive page numbers such that a user reading the book-of-one would view and consume the single unified document as if the content had come from a single source, such as with a book, journal, or magazine publisher. Unfortunately, there have been many challenges in trying to implement such content aggregation methods. For instance, the content of each source may be formatted differently in layout, style, fonts, auxiliary graphics, color, and various markers such as page numbers. Also, various markers may include graphic symbols, headers, footers, page numbers, time and dates, security markings, barcodes, etc.

In particular, for page numbers, these types of markers ought to be removed before re-usage. Documents may be created without variable markers, such as page numbers. However the solution described within is intended to work with document content already created or scanned, and which was not originally intended to be reused, such as printed materials with page numbers. Manually removing page numbers is a very demanding task. Automating such manual processes has been difficult to implement as the page numbers may be located in different places on a page. Occasionally page numbers use different numbering systems (e.g. Arabic, Roman, Greek, Cyrillic, etc.) and may be of different fonts, sizes, color, and italics depending on the media content. Further, various page number conventions may be followed such as the Chicago Manual of Style, the Bluebook, or numerous publisher internal guidelines.

A document may encompass scanned images of physical books, treatises, journals, magazines, comic books, manuscripts, and electronic copies of such materials. These documents may also be created or used in applications such as in MS-Word™ (.doc, .docx), Adobe™ personal document format (PDF), EPUB™ eBooks, Amazon™ Kindle™ eBooks, and the like, as well as other created content.

This description describes a new technique for finding and removing markers, specifically page numbers, in a fast, efficient, and accurate manner. Publishers can ingest various content sources, manage customer or user desired selections from a catalog of the various content sources, and with this new technique, allow for the routing of the combined content into a "book-of-one." This "book-of-one" may be printed or electronically transmitted to and stored on electronic content reader devices.

Figure 1:
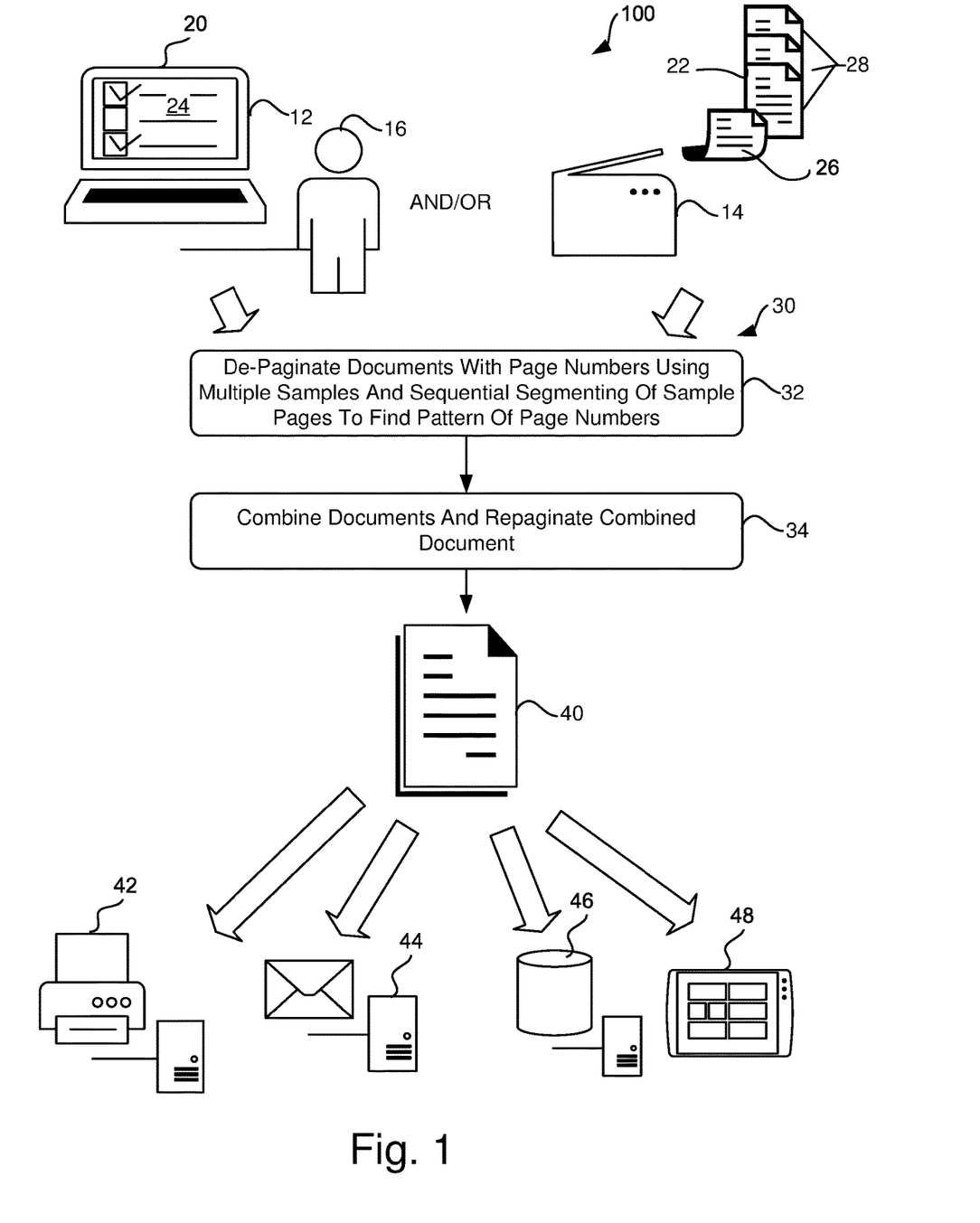
FIG. 1 is a diagram of an example environment for repurposing a document.

FIG. 1 is a diagram of an example environment 10 that uses the new technique 30 that is described in further detail within to repurpose a document 22. A user 16 may select electronic media, pre-scanned printed media, or other content on a local device 20 using a user interface 24. Local device 20 may be a personal PC, a server, or a mobile device such as a smartphone, personal data assistant, tablet, or media pad as just some examples. Local device 20 may also be a terminal, smart client, web browser, etc. Local device 20 may be coupled to a remote computer, server, web-site, or cloud service, etc. through a communication interface. A communication interface may be a wired or wireless network, dedicated links, Intra or Inter-net, phone modems, and the like. In some examples, a user 16 may directly or indirectly scan printed content 22 having one or multiple pages 26 on a scanning device 14, such as a photocopier, line scanner, page scanner, or camera imaging. Each electronic or printed document 22 may contain samples 28 of three or more pages from which page numbers or other markers may be searched for, recognized, and located within a page 26.

The new technique 30 in block 32 begins by de-paginating documents (or removing markers in general) with page numbers 70 using multiple samples 28 and sequential segmenting of pages 26 from the sample 28 to find a pattern of page numbers 70 (or other markers) within the content. Once a pattern of page numbers 70 (or markers) is found, the remaining pages 26 are processed to remove the page numbers 70 (or markers) based on using the detected pattern.

In block 34, the documents 22, with their page numbers 70 (or markers) accordingly removed, are combined as determined by the user 16 or a third-party editor. The combined document is repaginated (or in the case of markers in general, re-marked as desired) to create a "book-of-one" document 40 with consistent consecutive page numbers 70 (or desired new markers).

For ease of discussion and understanding of the claimed subject matter, the following description, unless noted otherwise, will describe the method and system of implementing the new technique 30 with respect to page numbers 70. Those of skill in the art will appreciate that the concept can be extended to any graphical or alpha-numeric markers 72 in general as will be explained later in FIGS. 9A-9B.

Figure 2:
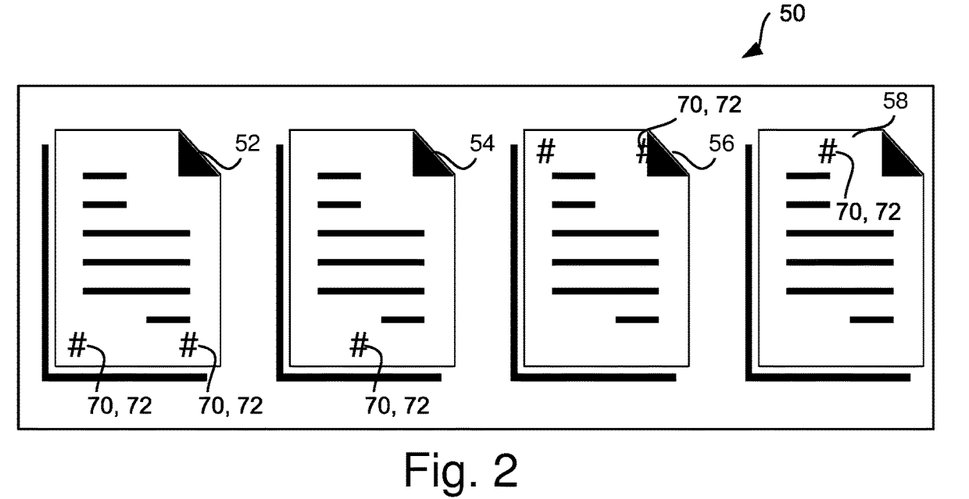
FIG. 2 is a diagram of example page number locations.

FIG. 2 is a first diagram 50 of example locations of page numbers 70 or markers 72 in best-case scenarios. In first document 52, there may be page numbers 70 or markers 72 located at the bottom left or right corners. For instance, left pages 26 in document 22 may have the page numbers 70 or markers 72 on the left bottom corner, and right pages 26 in document 22 may have the page numbers 70 or markers 72 on the right lower, bottom, or footer corner. In other conventions, odd page numbers 70 may be on one side on the bottom and even page numbers 70 located on the opposite side on the bottom. In second document 54, the page number 70 is simply located in the center bottom of page 26. In third document 56, a publisher may wish to have the page number 70 located on the top, upper, or header portion of page 26. Like first document 52, the page number 70 or marker 72 may be located on the left or right side of page 26. Also, like second document 54, the page number 70 or marker 72 may be located at the top in the center. Other locations for page numbers 70 or other markers 72 may include in the left or right margins at the top, bottom, center or other locations within. In some example documents 22, the page numbers 70 or markers 72 may be left out in various sections or use different page numbering schemes or locations.

Figure 3:
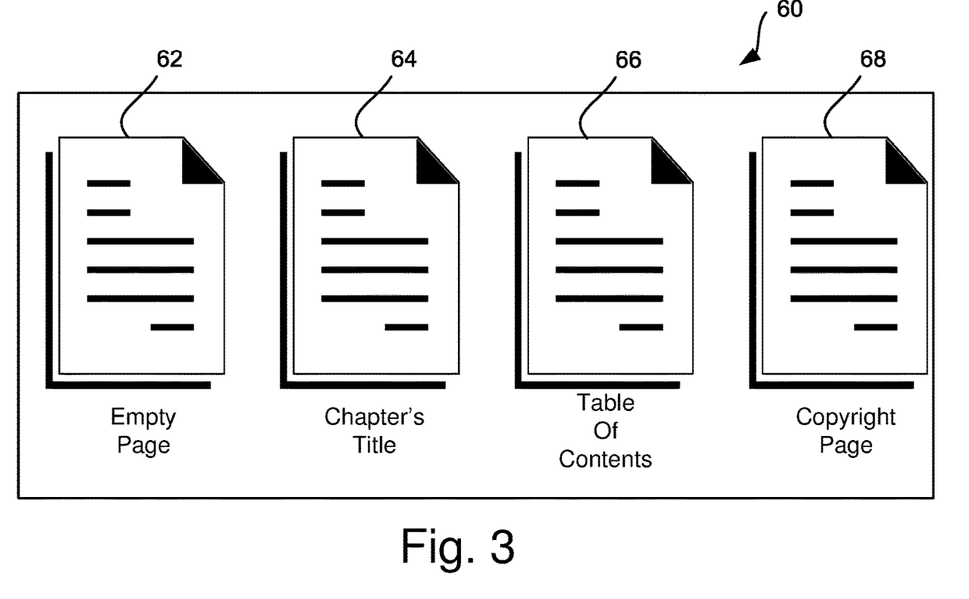
FIG. 3 is a diagram of example types of pages.

For example, FIG. 3 is a second diagram 60 of example types of pages 26 within a document 22 that may be atypical. In this example, there may be a set of empty pages 62, chapter title pages 64, table of content pages 66, and a copyright page 68 that all may have different page number 70 or marker 72 formatting and placement than that of the internal content. Other sections that may have different page numbering may include prefaces, introductory material, forewords, acknowledgements, prologues, appendices, indexes, glossary, bibliography, colophon, post face, and the like. Accordingly, in some documents, locating page numbers 70 or markers 72 can become quite complex.

Simple approaches to trying to locate the page number 70 or other markers 72 with optical character recognition (OCR) tools have been unreliable. They may easily be fooled by other numbers or markers on the page such as with math books with numbers, science papers with formulas, tables, and charts of numbers, etc. Some OCR systems allow for removing page numbers, but a user must manually recognize a pattern and enter it into the OCR system. Contrarily, the new technique 30 allows for the automatic detection of the location of page number 70 and marker 72 and automatic recognition of the page number and marker pattern(s) within a document 22.

Figure 4A:
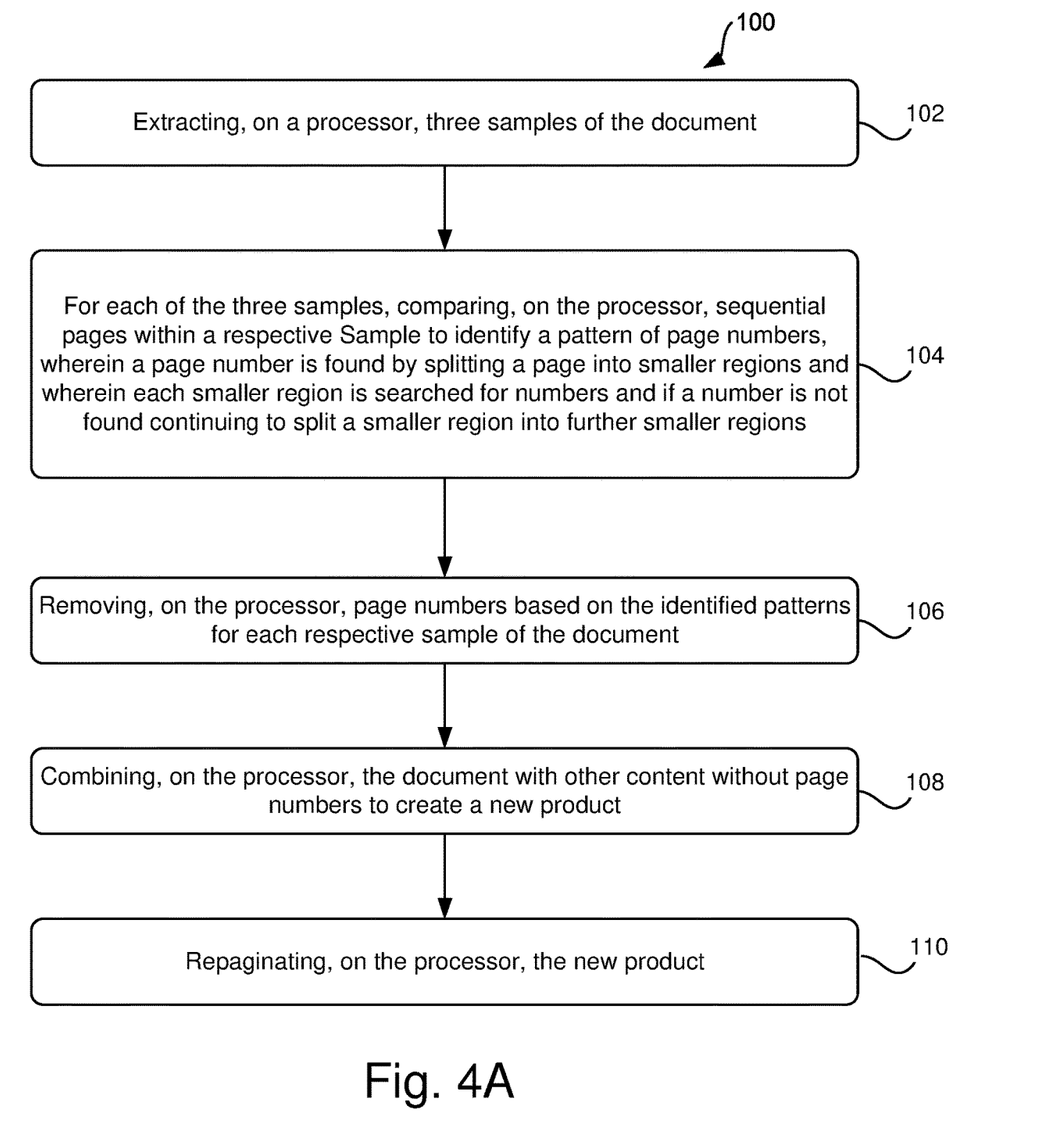
FIG. 4A is a flowchart of an example method of multiple operations for repurposing a document.

FIG. 4A is a flowchart of an example method 100 of the new technique 30 of multiple operations for repurposing a document 22. The method 100 is a computer implemented method by which a processor (202, FIG. 5A) reads and executes instructions from a computer readable medium (204, FIG. 5A) to perform the various operations. These instructions may consist of routines, sub-routines, object oriented modules, containers, and the like. The following described operational blocks may be implemented on one or multiple processors 202 that are communicatively linked on one or multiple circuits. The processors 202 may be physically located in the same overall computer or distributed over various physical, virtual, and cloud-based locations.

In block 102, a processor 202 extracts at least three samples 28 of document 22. In one example, the three samples 28 may be from a front, a middle, and an end section of document 22. In other examples, there may be more than three samples 28 but each from different sections of document 22 such as by reading the table of contents page 66 and determining the locations within the document 22. Each of the samples 28 may be from about three pages to about ten percent of document 22, or in the case of smaller sections, the sample size may be just the size of the small section, for instance, just one to a few pages for the table of contents page 66. "About" in this context may encompass plus or minus three percent of document 22. By using on a small sample 28 of the document to identify patterns of page numbers, the process is speeded up in not having to OCR the entire document.

In block 104, for each of the three or more samples 28, the processor 202 compares sequential pages 26 within a respective sample 28 to identify a pattern of page numbers 70. A page number 70 is found by splitting a page 26 into sequentially smaller regions. Each smaller region is searched for numbers and if a number is not found continuing to split a smaller region into further smaller regions. There may be various approaches to splitting a page 26 into smaller regions such as shown and described in FIG. 8. For instance, a page number 70 may be found by splitting a page 26 into smaller and smaller regions of page 26 and detecting the text from it, until a region is found that contains a number, and no other smaller region is found that contains the same number found in the previous region. There is no reason to recognize the full text of the page with OCR since this new technique is just searching for numeric or other marker patterns. The searching may be done with pattern recognition matching using moment analysis, correlation, principal component analysis, image extraction or partial OCR, as just some approaches. In one example, page 26 may be split into four sections vertically (top, top-middle, bottom-middle, and bottom). If a number is found, it may be a potential page number 70. If not found with the pattern matching, or a more precise location is desired, the four sections may be split further into even smaller sections such as a tic-tac-tow section of nine smaller portions to determine top, bottom, middle and left, right, and center positions. Other splitting approaches may be 3-4, 3-6-8, and the like. A found number may be identified and classified by the location of the smallest region. An identified pattern for the page number 70 may be by noting for even and odd pages the most likely identified pattern such as by majority vote (e.g. in the case of the inclusion of blank pages). If the even and odd pages have the same identified pattern, then a single pattern may be returned for the sample 28 otherwise two patterns may be returned. If sample 28 has multiple identified patterns, such as one pattern for the first section of sample 28 and the second pattern for a second section of the sample, the identified patterns may be returned with the page locations of the different patterns. One best case scenario has page numbers 70 found either on top or bottom of pages 26, either centralized or alternating on the left hand of even pages 26 and on the right side of odd pages 26.

In block 106, the processor 202 removes the page numbers 70 based on the identified pattern(s) for each respective sample 28 of document 22. If the first sample 28 has an identified pattern that matches an identified pattern of an adjacent second sample 28 (or second matches adjacent third sample); then all the pages of the document represented by the first and second samples 28 (or second and third samples 28, respectively) have their page numbers 70 removed based on the respectively identified pattern.

In block 108, the processor 202 combines the document 22 with other content such as other documents without page numbers 70 (either unpaginated or also having been processed by the new technique 30 to remove page numbers) to create a new product.

In block 110, the processor 202 repaginates the new product to create the "book-of-one" document 40.

Figure 4B:
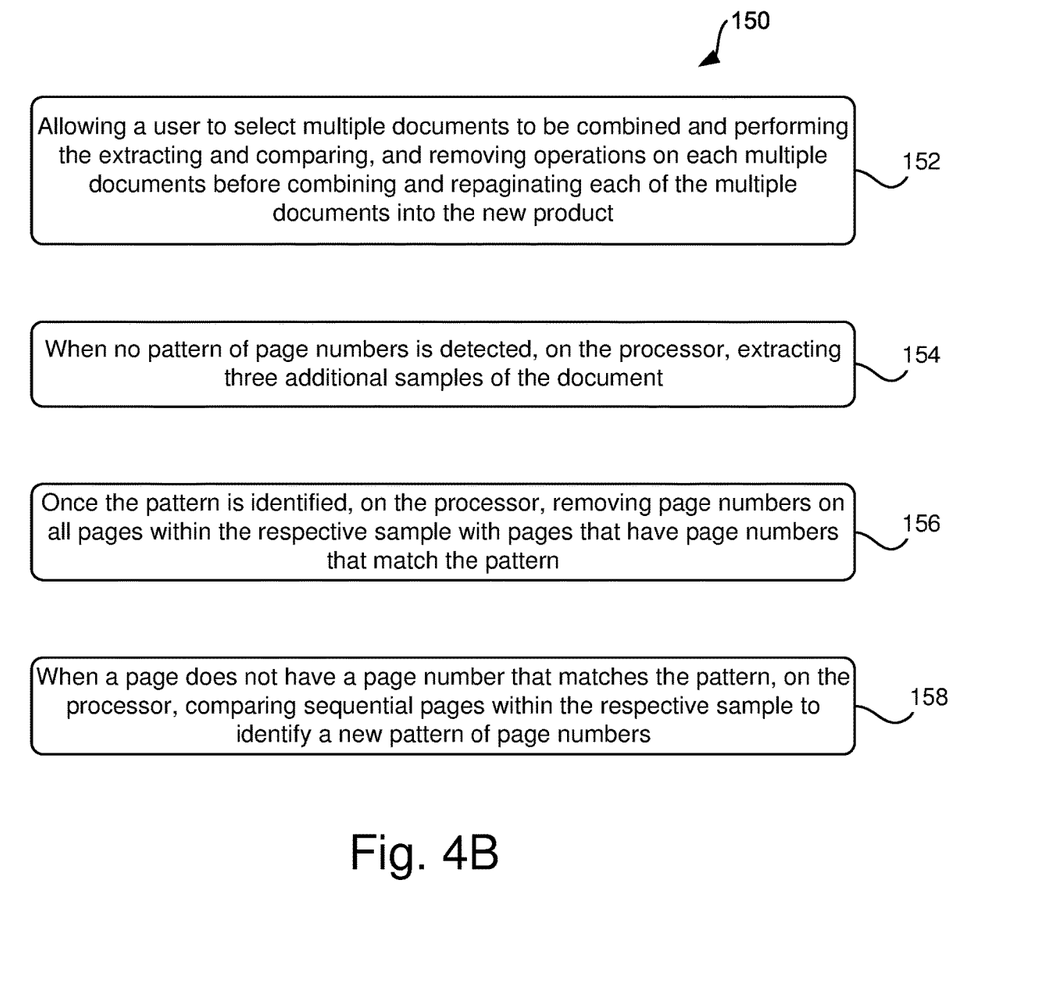
FIG. 4B is a collection of additional example operations for the method of FIG. 4A.

FIG. 4B is a collection of additional example operations 150 for the method 100 of FIG. 4A, to which they may be singularly or multiply combined. For instance, in block 152, the processor 202 may allow a user 16 to select multiple documents 22 (such as with user interface 24 of FIG. 1 or otherwise) to be combined. The processor 202 performs the operations of extracting and comparing 104 and removing 106 operations on each of the multiple documents 22 before combining 108 and repaginating 110 each of the multiple documents 22 into the new product.

In block 154, the processor 202 may, when no pattern of page numbers 70 is detected, extract three additional samples 28 of the document 22 to get a better representation of the document 22 content. For instance, if one sample 28 is from the front of document 22 it may contain prefaces, prologs, table of contents, and other introductory matter that does not represent the main or central content of document 22. If another sample 28 is from the back of document 22, it may contain indexes, bibliographies, definitions, and post faces, which also may not be indicative of the central content of document 22. Generally, 10% of the content of document 22 may be able to get a sufficient sample 28 of the central content such that a pattern of page numbers 70 may be identified for each of the three samples 28. However, it not, then additional samples 28 may be taken from the document 22 such as towards the center of document 22 to allow for a better page number 70 pattern identification.

In block 156 the processor 202 may, once the pattern is identified, remove page numbers 70 on all pages within the respective sample 28 with pages that have page numbers that match the pattern. The processor 202 may also remove page numbers 70 on the rest of the document 22 that was not sampled using identified pattern(s) of page numbers 70.

In block 158, the processor 202 may, when a page 26 does not have a page number 70 that matches the pattern, compare sequential pages 26 within the respective sample 28 to identify a new pattern of page numbers 70.

Figure 5A:
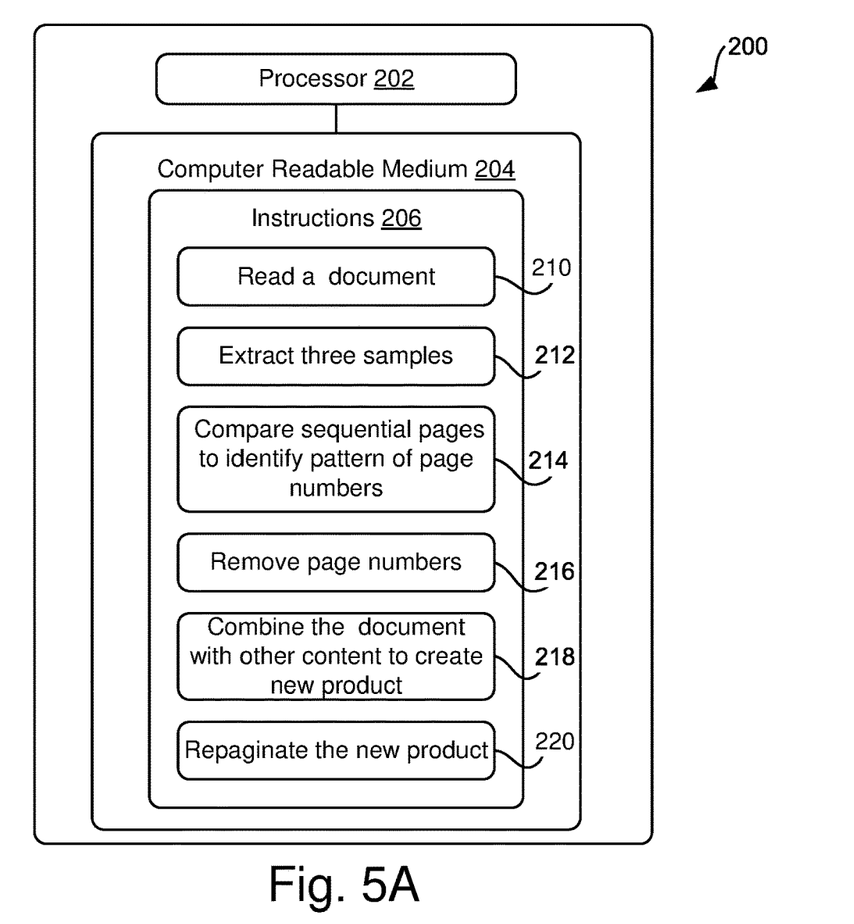
FIG. 5A is a block diagram of an example system for repurposing a document.

FIG. 5A is a block diagram of an example system 200 for repurposing a document 22. A processor 202 is coupled to a non-transitory and tangible computer readable medium (CRM) 204 that contains instructions 206 that when read and executed by processor 202 cause the processor to perform various operations that may be performed by the instructions organized into routines, sub-routines, modules, containers, and the like. The system 200 may also contain additional hardware or logic to help the processor perform the instructions 206. Accordingly, the various examples described herein may include logic or several components, modules, or constituents. Modules may constitute either software modules, such as code embedded in the CRM 204 or hardware modules. A hardware module is a tangible unit capable of performing certain operations and by be configured or arranged in certain manners. In one example, the computer system 200 or one or multiple hardware modules of the computer system 200 may be configured by software (e.g. an application, or portion of an application) as a hardware module that operates to perform certain operations as described herein.

The CRM 204 allows for storage of one or multiple sets of data structures and instructions 206 (e.g. software, firmware, logic) embodying or utilized by any one or multiple of the methodologies or functions described herein. The instructions 206 may also reside, completely or at least partially, within the static memory, the main memory, and the processor 202 during execution by the computing system 200. The main memory and the processor 202 memory also constitute CRM 204. The term "computer readable medium" 204 may include single medium or multiple media (centralized or distributed) that store the one or multiple instructions or data structures. The CRM 204 may be implemented to include, but not limited to, solid state, optical, and magnetic media whether volatile or non-volatile. Such examples include, semiconductor memory devices (e.g. Erasable Programmable Read-Only Memory (EPROM), Electrically Erasable Programmable Read-only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

In block 210, the processor 202 reads a first document 22 that has multiple pages 26. In block 212, the processor 202 extracts at least three samples 28 of the multiple pages 26, for instance from a front, a middle, and an end of document 22. In other examples, the three samples 28 may be from different sections at the front, middle, and end of document 22, such as the table of contents section from the front, the main or central section from the middle, and an index section at the end of document 22. Each of the samples 28 may be up to about 10% of the total content of document 22.

In block 214, the processor 204, for each of the three samples 28 the processor compares sequential pages 26 within a respective sample 28 to identify a pattern of page numbers 70. This identifying is done by comparing sequential pages 26 within a respective sample 28 to identify a pattern of page numbers 70. A page number 70 is found by splitting a page into smaller regions, and each smaller region is searched for numbers and if a number is not found, continuing to split a smaller region into further smaller regions.

In block 216, the processor removes page numbers 70 based on the identified patter for each respective sample 28 of document 22. In block 218, the processor combines the document 22 with other content such as a second document 22 without page numbers to create a new product 40. In block 220, the processor then repaginates the new product thereby repurposing the document into the new product 40.

Figure 5B:
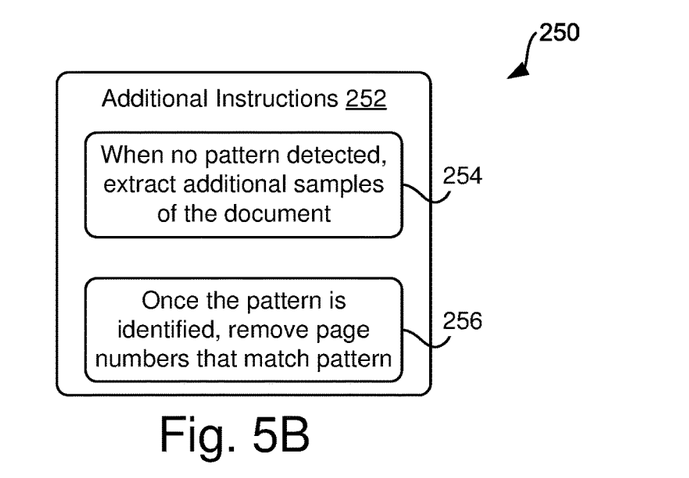
FIG. 5B is a block diagram of additional example instructions that may be used in the example system of FIG. 5A.

FIG. 5B is a block diagram 250 of additional example instructions 252 that may be used in the example system 200 of FIG. 5A. The three samples 28 may each represent about 10% of the content of document 22 but at least three pages. In block 254, when no pattern of page numbers 70 is detected by the processor 202, the processor 202 may extract additional samples 28 of document 22 from the representative portion of document 22 which the respective sample 28 was taken. In block 258, once the pattern is identified, the processor 202 removes page numbers 70 on all pages 26 within the respective sample 28 with pages 26 that have page numbers 70 that match the pattern.

Figure 6:
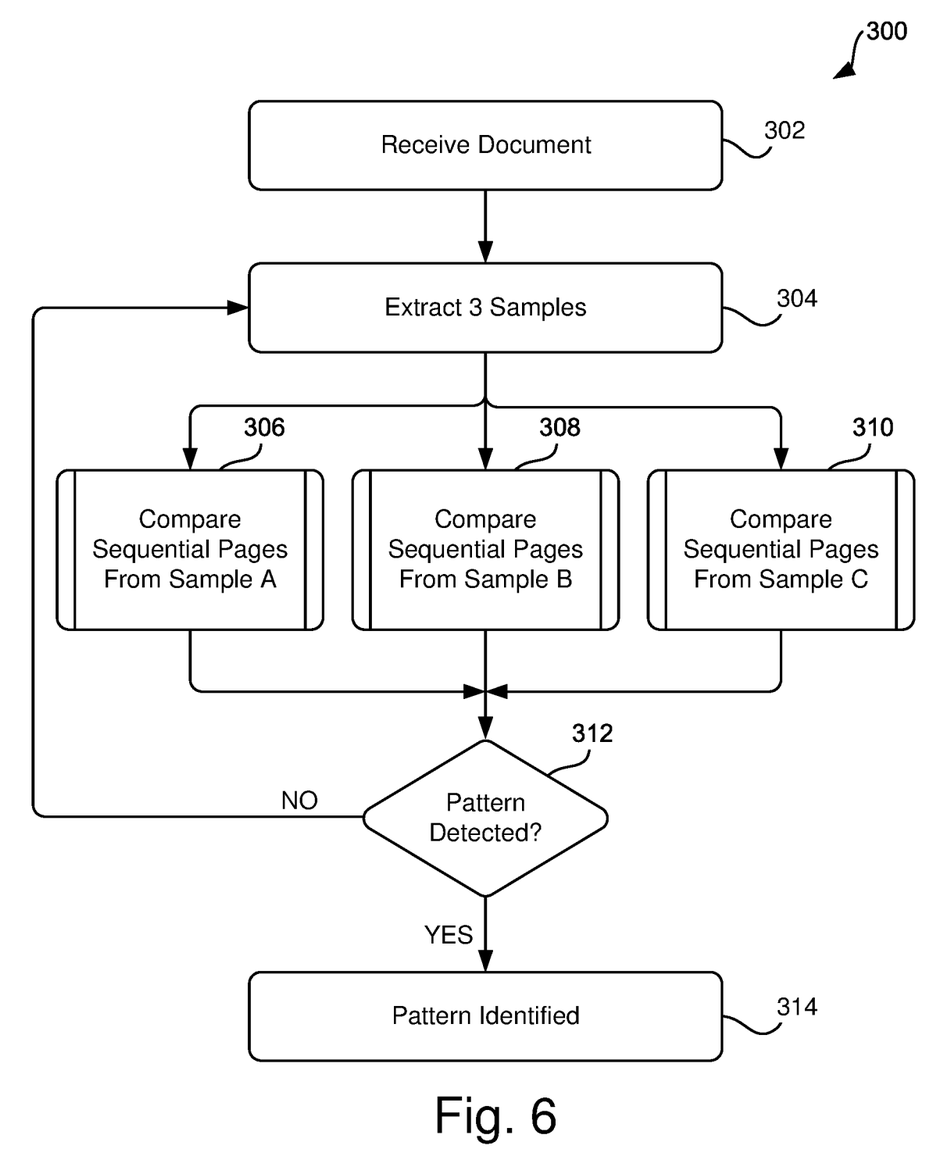
FIG. 6 is a workflow of an example method for finding patterns within pages of content.

FIG. 6 is a workflow of an example method 300 for finding patterns within pages 26 of the content of document 22. In block 302, document 22 is received to be repurposed. In block 304, at least three samples 28 of document 22 is sampled. In each of blocks 306, 308, and 310, the respective samples 28 are processed to compare sequential pages from the sample 28 to identify one or multiple patterns of page numbers 70. A page number 70 is found by splitting a page 26 into smaller regions. Each smaller region is searched for numbers and if a number is not found continuing to split a smaller region into further smaller regions. There may be various approaches to splitting a page 26 into smaller regions such as shown and described in FIG. 8. For instance, a page number 70 may be found by splitting a page 26 into smaller and smaller regions of page 26 and detecting the text from it, until a region is found that contains a number, and no other smaller region is found that contains the same number found in the previous region. There is no reason to recognize the full text of the page with OCR since this new technique is just searching for numeric or other marker patterns. The searching may be done with pattern recognition matching using moment analysis, correlation, image extraction, principal component analysis or partial OCR, as just some approaches. In one example, page 26 may be split into four sections vertically (top, top-middle, bottom-middle, and bottom). If a number is found, it may be a potential page number 70. If not found with the pattern matching, or a more precise location is desired, the four sections may be split further into even smaller sections such as a tic-tac-tow section of nine smaller portions to determine top, bottom, vertical-center and left, right, and horizontal-center positions. Other splitting approaches may be 3-4, 3-6-8, and the like. A found number may be identified and classified by the location of the smallest region. An identified pattern for the page number 70 may be by noting for even and odd pages the most likely identified pattern such as by majority vote (such as in the case of blank pages). If the even and odd pages have the same identified pattern, then a single pattern may be returned for the sample 28 otherwise two patterns may be returned. If sample 28 has multiple identified patterns, such as a first pattern for a first section of sample 28 and a second pattern for a second section of the sample, the identified patterns may be returned along with the page locations of the different patterns. One best case scenario as page numbers 70 found either on top or bottom of pages 26, either centralized or alternating on the left hand of even pages 26 and on the right side of odd pages 26.

In block 312 the output of each of the sample 28 comparisons identifications of patterns is checked to determine if there have been one or multiple patterns identified for each of the samples 28. If a sample 28 has not returned a pattern, the flow returns to block 304 to get additional samples 28 from the respective sections of document 22. If patterns have been detected in all three samples 28 then in block 314 the overall pattern is identified for the document for each of the respective samples 28, and their specific parent content portions of document 22 will remove the page numbers 70 from the respective parent content with the respective page number patterns for each sample 28. This approach reduces or eliminates having to check each page of the document for page numbers 70 and avoids situations where the page content text has numbers (for example, a math book). An OCR based page scanning system my incorrectly delete such random pieces of numbers in the original text of document 22.

Figure 7:
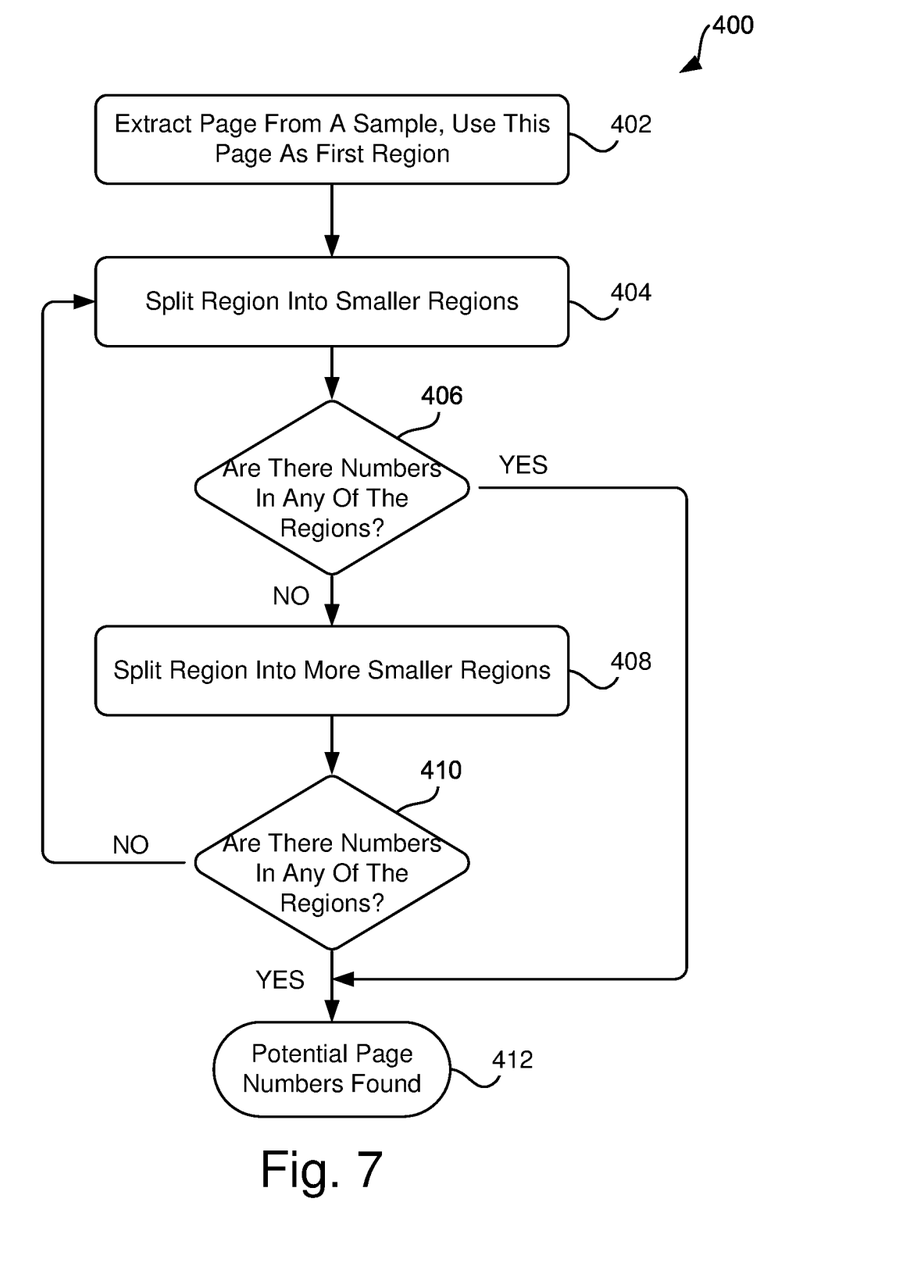
FIG. 7 is a flowchart of an example method of consecutive splitting of a page to find page numbers.

FIG. 7 is a flowchart of an example method 400 of the consecutive splitting of page 26 to find page numbers 70. In block 402, page 26 is extracted from a sample 28, and this page 26 is used as a first region. In block 404, this first region is split into smaller regions, one example being by four (4) smaller regions, another example being three (3) smaller regions. In decision block 406, it is determined if there are any numbers in any of the regions. This determination can be done by limited OCR, pattern matching, correlation, and other text or graphic recognition techniques as discussed previously. If there is a number in any of the regions, then flow continues to block 412 where potential page numbers may have been found. If it is determined in decision block 406 that there are no numbers in any of the regions, then flow continues to block 408 and the first region is split into more smaller regions, such as each of the four smaller regions being split into nine (9) smaller regions. In decision block 410, a determination is made if there are any numbers in any of these smaller regions. If so, then potential page numbers 70 may have been found in block 412. If not, then flow continues back to block 404, and the small regions are split into smaller regions, and the search continues for as long as desired. In some examples, there may be splitting of regions twice such as by 4 and then by 9. Other examples may continue to split longer such as by 3 to determine left, center, right; then by 6 to check for the top, bottom, center and relative left and right locations; and then by 8 to fine tune the location for fine resolution of the identified pattern.

Figure 8:
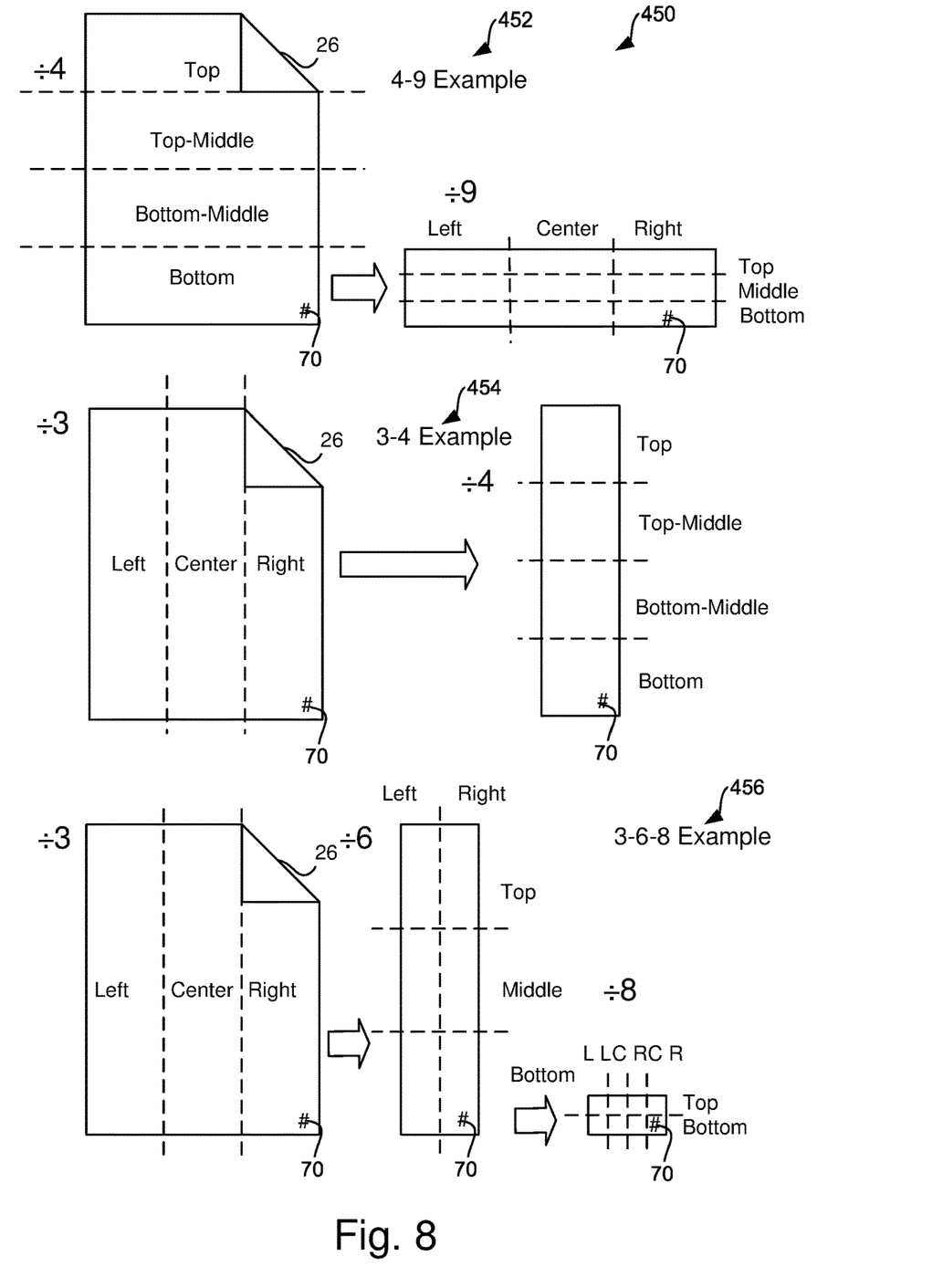
FIG. 8 is a diagram of several examples of how to consecutively split a page to find page numbers.

FIG. 8 is a diagram 450 of several examples of how to consecutively split a page to find page numbers 70. In the 4-9 Example 452, a page 26 is first split into four sections to denote a top region, a top-middle region, a bottom-middle region, and a bottom region. There are no page numbers 70 located in the top three regions but the page number 70 (denoted as "#" in the drawing), in this example, is found in the lower right bottom region and thus may be a potential page number. Additional checking for page numbers can be done by further splitting each of the regions further into nine sections as illustrated to provide a top, middle, and bottom with left, center, and right locations. In this example, the page number 70 is found in the bottom-right section. If found on at least three consecutive pages, the identified page number 70 may be identified as having a pattern of bottom-bottom-right. Other pages within a sample 28 and those represented by the sample 28 may have their respective page numbers 70 removed from the bottom-bottom-right region without having to scan each page individually for the page number 70 thereby increasing speed, efficiency, and accuracy of the page number removal and allowing the document to be repurposed.

In the 3-4 Example 454, the page 26 is first split into three sections denoting left, center, and right where page number 70 is found in the right section. A further sectioning is done by dividing each of the sections into four sections, top, top-middle, bottom-middle, and bottom. Page 70 is found in the bottom section. If found on at least three consecutive pages, the identified page number 70 may be identified as having a pattern of right-bottom. This 3-4 Example 454 may be used when the detection of the page number for each section provides for more detailed location of a page number 70 within a detected region. The 4-9 Example 452 by providing more specific location by the smaller region sizes allows for a less complex page number 70 detection scheme. Alternatively, the 3-4 Example 454 can continue to apply the 3-4 sectioning to create ever smaller sections in which to locate a page number 70 or other marker 72.

In some examples, the sectioning of page 26 may include more than just two types of sectioning operations. In the 3-6-8 Example 456, the page 26 is first split into three sections denoting left, center, and right with the page number 70 being in the right section in this example. The sections may then be further sectioned into six sections denoting left, right with top, middle, and bottom regions. In this example, page number 70 is located in the left-bottom region. Each of these six sections may then be further sectioned in a third sectioning operation by splitting each of the small regions into eight smaller sections creating a left (L), left-center (LC), right center (RC), and right (R) regions with top and bottom designations. The page number 70 is now identified in the right-bottom-right-bottom region. By having such a fine sectioning of page 26 into such small regions, the page number detection technique may focus on just searching for numeric patterns and not be required to return where the page number is located within the section as that information is provided by the 3-6-8 Example 456 sectioning.

Figure 9A:
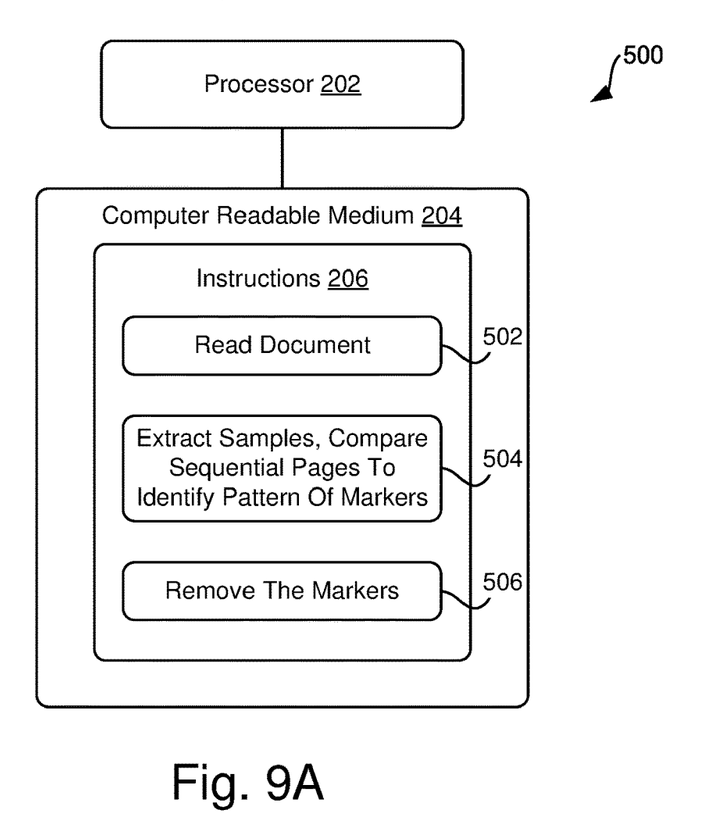
FIG. 9A is a block diagram of an example processor and computer readable medium with example instructions for finding markers in general, such as page numbers when repurposing a document.

FIG. 9A is a block diagram 500 of an example processor 202 and computer readable medium 204 with example instructions 206 for finding any markers 72 in general, including page numbers 70, when repurposing a document 22. In block 502, the instructions 206 cause the processor 202 to read a document 22 having multiple pages 26. In block 504, the processor 202 extracts three samples 28 of the multiple pages 26 of document 22. In block 504, the processor 202 for each of the three samples 28, compares sequential pages 26 within a respective sample 28 to identify a pattern of markers 72. A marker 72 is found by splitting a page into smaller regions. Each smaller region is searched for the marker 72 and if the marker 72 is not found, continuing to split a smaller region into further smaller regions. For example, a page 26 may be first split into four smaller regions and then split into nine further regions. This sectioning may continue by splitting the nine further regions into four smaller regions and if needed, splitting the four smaller regions into nine further regions. The number of times a page is split depends on the content on the page, the size of the fonts, and the ability of the page number detection pattern recognition technique to determine the location of a page number within a split section.

Once the marker 72 is found, and a pattern identified, in block 506, the processor 202 removes the markers 72 based on the identified patterns for each respective sample 28 of document 22. Each sample 28 may have one or multiple patterns, and in some examples, each sample 28 may have the same patterns as other samples 28.

Figure 9B:
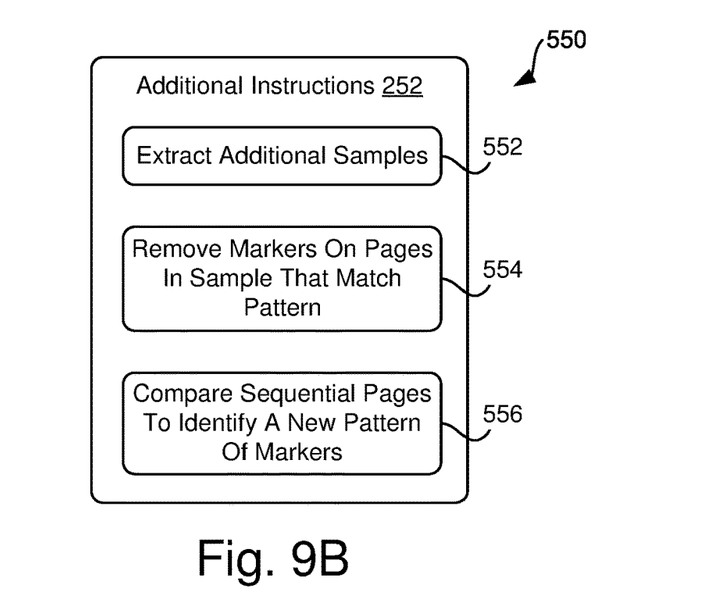
FIG. 9B is a block diagram of additional example instructions that may be used with the example instructions in FIG. 9A.

FIG. 9B is a block diagram 550 of additional example instructions 252 that may be used with the example instructions 206 in FIG. 9A. In block 552, when no patter of the markers 72 is detected, the processor 204 extracts additional samples 28 of document 22, such as one to three additional samples 28.

In block 554, once the pattern is identified, the pattern will be used to remove the markers 72 on all pages represented by the respective sample with pages that have the markers 72 that match the identified pattern. For instance, odd pages will have a different pattern than even pages in some documents 22 and thus odd pages will have markers 72 that match odd page patterns removed and even pages will have markers 72 that match even page patterns removed.

In block 556, when a page 26 does not have a respective marker that matches the pattern identified, the additional instructions 252 cause the processor 202 to compare sequential pages within the respective sample to identify a new patter of the markers. For instance, a sample from the front of document 22 may have multiple introductory sections with different formats of page numbers 26 and different locations. In one example, the table of contents may have Roman numerals centered at the bottom of the page while the other sections have Arabic numbering with different odd and even page number 70 locations.

In summary, the claimed subject matter relates to marker 72 removal, particularly page number 70 markers 72. By locating and removing markers 72, multiple documents 22 (such as books, etc.) may be combined into larger volumes and then re-marked accordingly (for page numbers, the re-marking is done by repaginating). The new technique 30 allows for a faster, more cost efficient, and a simpler recognition process than full page OCR. To quickly locate where markers 72 may be located within a document 22 at least three samples 28 of document 22 are extracted, for instance about 10% from the front, about 10% from the middle, and about 10% from the end. From each sample 28, sequential pages 26 are checked to locate markers 72 and determine patterns of markers 72. Potential markers 72 are found by splitting pages 26 into smaller and smaller regions and detecting markers 72 until a region is found that contains a marker 72, and no smaller region is found that contains the same marker 72 found in the previous region. In one example, the splitting is done by first segmenting a page into four sections denoting top/bottom/right/left and then segmenting each of the four sections into nine separate regions (i.e. a 4-9 multi-segmentation). Other multi-segmentation schemes may be used such as 3-4 and 3-6-8 as just a couple of additional examples.

Accordingly, this new technique 30 allows samples 28 to be used to find matching patterns from different parts of the document content pages. This sampling technique enables a fast track process in best case scenarios. Some worst-case scenarios may cause the new technique 30 to select a new sample 28 from that specific section of information. The comparison process may run in about 30% of the content of the document in at least three pages for each sample 28. In some examples, no text need be recognized on the sample 28 pages 26 as the new technique 30 works in terms of identifying patterns within the samples and applying the patterns found to the remaining content. For instance, with page number 70 markers 72, they typically appear in a usual fashion in sequential pages.

While the claimed subject matter has been particularly shown and described with reference to the preceding examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The preceding examples are illustrative, and no single feature or element is used in all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A non-transitory computer readable medium for repurposing a document, comprising instructions that when read and executed by a processor cause the processor to:
   read a document having multiple pages;
   extract three samples of the multiple pages of the document;
   for each of the three samples, compare sequential pages within a respective sample to identify a pattern of markers, wherein a marker is found by splitting a page into smaller regions that are each smaller than the page, wherein each smaller region is searched for the marker and if the marker is not found continuing to split a smaller region into further smaller regions that are each smaller than the smaller region, and wherein each further smaller region is searched for the marker; and remove the markers based on identified patterns for each respective sample of the document.

2. The non-transitory computer readable medium of claim 1, wherein a page is first split into four smaller regions and then split into nine further smaller regions.

3. The non-transitory computer readable medium of claim 1, wherein the three samples each represent about 10% of the content of the document and respectively represent a front, a middle, and an end section of the document.

4. The non-transitory computer readable medium of claim 1, wherein when no pattern of the markers is detected, the processor extracts three additional samples of the document.

5. The non-transitory computer readable medium of claim 1, wherein once the pattern is identified, the pattern will be used to remove the markers on all pages represented by the respective sample with pages that have the markers that match the pattern.

6. The non-transitory computer readable medium of claim 5, wherein when a page does not have a respective marker that matches the pattern, the instructions cause the processor to compare sequential pages within the respective sample to identify a new pattern of markers.

7. A computer implemented method of repurposing a document, comprising:

extracting, on a processor, three samples of the document;

for each of the three samples, comparing, on the processor, sequential pages within a respective sample to identify a pattern of page numbers, wherein a page number is found by splitting a page into smaller regions that are each smaller than the page, wherein each smaller region is searched for numbers and if a number is not found continuing to split a smaller region into further smaller regions that are each smaller than the smaller region, and wherein each further smaller region is searched for the numbers;

removing, on the processor, page numbers based on the identified patterns for each respective sample of the document;

combining, on the processor, the document with other content without page numbers to create a new product; and repaginating, on the processor, the new product.

8. The computer implemented method of claim 7, further comprising allowing a user to select multiple documents to be combined and performing the extracting and comparing, and removing operations on each of the multiple documents before combining and repaginating each of the multiple documents into the new product.

9. The computer implemented method of claim 7, wherein a page is first split into four smaller regions and then split into nine further smaller regions.

10. The computer implemented method of claim 7, wherein the three samples each represent 3% to 10% of the content of the document and are from a front, a middle, and an end of the document.

11. The computer implemented method of claim 7, wherein when no pattern of page numbers is detected, on the processor, extracting three additional samples of the document.

12. The computer implemented method of claim 7, wherein once the pattern is identified, on the processor, removing page numbers on all pages within the respective sample with pages that have page numbers that match the pattern.

13. The computer implemented method of claim 12, wherein when a page does not have a page number that matches the pattern, on the processor, comparing sequential pages within the respective sample to identify a new pattern of page numbers.

14. A system for repurposing a document, comprising:
a processor;
a computer readable medium coupled to the processor containing instructions that when read and executed by the processor cause the processor to:
read a first document having multiple pages;
extract three samples of the multiple pages of the first document from a front, a middle, and an end of the document;
for each of the three samples, compare sequential pages within a respective sample to identify a pattern of page numbers, wherein a page number is found by splitting a page into smaller regions that are each smaller than the page, wherein each smaller region is searched for numbers and if a number is not found continuing to split a smaller region into further smaller regions that are each smaller than the smaller region, and wherein each further smaller region is searched for the numbers;
remove page numbers based on identified patterns for each respective sample of the document;
combine the first document with a second document; and
repaginate the combined first and second documents.

15. The system of claim 14, wherein the three samples each represent about 10% of the content of the document but at least three pages and further comprising instructions to:
when no pattern of page numbers is detected, extract three additional samples of the first document; and
once the pattern is identified, remove page numbers on all pages within the respective sample with pages that have page numbers that match the pattern.

* * * * *